Sept. 28, 1943.    M. M. BRUBAKER    2,330,333
COATING PROCESS AND PRODUCT
Filed Aug. 2, 1940

INVENTOR.
Merlin Martin Brubaker
BY Harold A. Jewett
ATTORNEY

Patented Sept. 28, 1943

2,330,333

UNITED STATES PATENT OFFICE 2,330,333

COATING PROCESS AND PRODUCT

Merlin Martin Brubaker, Wilmington, Del., assignor to E. I. du Pont de Nemours & Company, Wilmington, Del., a corporation of Delaware Application August 2, 1940, Serial No. 349,739

5 Claims. (Cl. 117—104)

This invention relates to the art of coating, particularly coating from melt.

Many different processes are known to the prior art, for applying coatings to articles of various kinds. Thus, widespread use has been made of various processes in which solutions are applied to or distributed upon the base and the solvent medium thereafter removed by evaporation or otherwise, leaving a film or layer of solid coating material on the surface of the base. All processes of this type, however, entail a need for removal or recovery of the solvent, either for purposes of economy or to safeguard the health of persons in the vicinity of the work, or to minimize corrosive effects, or for still other reasons; and in many instances the coating material itself comprises resins or plastic materials which require baking at relatively high temperatures and for considerable periods of time, in order to impart necessary qualities of durability and permanence to the residual coating material which is left after removal of the solvent.

It also is conventional to apply coatings of a metallic or vitreous nature, by methods involving fusion of metallic or siliceous coating materials, either shortly before, at the time of, or immediately after their application to the base. In connection with such procedures, the prior art discloses many variations of method, all of which nevertheless generally call for the comminution or atomization of the metallic or siliceous composition, when, if not in fact before, it has been transformed to the molten or fluid state. Such procedure has been applied in the case of paraffin, and certain thermoplastic coating materials, as well, but usually at relatively low temperatures.

The metallic, siliceous or other coatings applied by the aforesaid prior art methods have involved many disadvantages and difficulties, and present many unsolved problems. For instance, the globules of atomized, fused or fluid coating material either have solidified prior to their impingement on the base, or have attained the excessively viscous state of a supercooled liquid prior to such impingement. Poor adherence to the base, poor cohesion of the said globules to each other after their deposit on the base, and excessive porosity of the final coating generally have been encountered, in such instances.

Apart from the disadvantages just recited, and apart from special and expensive expedients to which resort has been made in efforts to minimize them, it is possible to take the view that there was nothing greatly surprising in the original discovery that metal or quartz would withstand, while molten, a high degree of agitation, comminution, and high speed projection toward and against an article to be coated. That is, the molecules of the particular metal, or of silicon dioxide, were known to be of relatively very simple chemical structure and to be quite resistant to disintegration consequent on the heating of the materials to temperatures far above their melting points. Accordingly, for them to be set violently into motion at such temperatures, even while in a liquid and highly comminuted condition, and yet retain their original molecular structure, may not have been unexpected. Insofar as I am aware, however, prior to my hereinafter described invention, it was altogether unknown to raise a high melting crystalline organic compound, having a molecular weight above, say, 3,000—in other words, composed of "giant" molecules—above its melting point, and thereupon to bring violent forces to bear upon it, so as not only to break it up into very finely divided globules or drops, but also to project those globules or drops at high rates of speed against a base to be coated, without engendering molecular distingration of the polymer. Moreover, it was not to be expected that the individual "giant" molecules of such a compound might stand up under such treatment, provided merely that precautions such as hereinafter described were observed. Especially was the successful application of coatings in such fashion not to be expected, when the particular polymer was one which possessed such a degree of thermal instability as to tend to decompose rapidly, even in the absence of comminution and agitation, at temperatures only about 30° C. above its melting point, and without first passing through any boiling point. It further was surprising that the film or layer of the material resulting from the projection of the said molten globules or drops upon the base could be made to adhere satisfactorily thereto.

In am aware that prior to my invention it was known to raise synthetic linear polymers of the types described in U. S. Patents 2,170,250, 2,071,251, 2,071,250, 2,130,523, and 2,130,948 to temperatures above their melting points and then to form them into filaments by extrusion into relatively very cold atmosphere. This procedure, however, did not involve any appreciable agitation, nor did it involve the maintenance of the molten polymer in a relatively finely divided state for longer than a very small fraction of a second. The possibility of molecular disintegration, therefore, did not give cause for great concern; even though, without special precautions, films or ribbons formed even by such process frequently exhibited molecular disintegration to such an extent as to render them brittle, and incapable of being bent sharply without breaking. In this connection, it should be borne in mind that the ratio of surface area of a body to its mass increases in geometric proportion as the size of the body decreases, and that in the case of a highly heated molten polymer whose molecules are of great size and therefore especially subject to distintegration—particularly when the particles of the molten polymer are placed in violent agitation—the said molecules naturally would be expected to be increasingly subject to such disintegration as the degree of comminution of the mass of polymer increased.

Having as an object the successful melt coating of articles with polymers of the aforesaid types, as well as the elimination of disadvantages such as hereinabove portrayed, in connection with prior art coatings generally—particularly melt-applied prior art coatings of metals or vitreous glazes—and also having as an object the production of non-metallic, organic coatings possessing unprecedented qualities of durability, toughness and resistance to corrosion, as well as great strength and elasticity, and still further qualities specified hereinafter, this invention accordingly is based on the discovery that polymers of the aforesaid types can be subjected to liquefaction, comminution, or atomization, such as hereinabove described, and then to violent projection against an article to be coated, without incurring thermal disintegration of the polymer molecules to a deleterious extent.

The invention consists further in the hereinafter described precautions and limitations which I have found to be either essential or desirable, for the achievement, respectively, of operability or of optimum results, in the carrying out of the process of the invention.

Of the types of polymers described in the hereinabove cited patents, the greatest success has been attained with the polyamides. The invention therefore will be described with particular reference to them.

Generally speaking, the foregoing objects, as well as others which will appear as the description of the invention proceeds, are accomplished by melting one or more of the said polyamides in an inert atmosphere, comminuting the resultant liquid by means of a high velocity current of relatively inert gas, projecting the resultant spray, mist, or fog of liquid polyamide against the article to be coated, and rapidly congealing the polyamide on the surface of the article, thus obtaining a coating having toughness, clarity and adherence to the said article.

Many variations of the process of the invention are possible, with respect to the manner of liquefying the polyamide and the method of comminution thereof, or with respect to the types of apparatus which are available for the accomplishment of such liquefaction and comminution. For instance using apparatus such as depicted in Fig. 1, which will be described hereinafter, the polyamide, in the form of a rod or relatively thick monofil, may be progressively fed into an apparatus or "spray gun" such as that described in U. S. P. 1,100,602, and continuously melted at its forward end by means of an appropriate flame, the resultant liquid being projected from the zone of melting by the force of gas under high pressure. Or, molten polyamide may be fed from a reservoir into a heated zone, there subjected to a similar stream of high pressured gas, and likewise projected against the base. It also is possible to sub-divide the liquid polyamide by the use of a centrifugal machine, or to start with pre-comminuted solid polyamide, in the form of finely divided particles which are blown into the zone of melting. Still further variations, as regards the melting or the comminution, will be detailed hereinafter.

In the preferred embodiments of the invention the article to be coated may be maintained at a temperature sufficiently below the melting point of the particular polyamide for the molten drops thereof to be cooled rapidly to a point considerably below their said melting point. This rapid cooling, which characteristically is necessary to the production of polyamide coatings having the maximum degree of toughness, pliability, and clarity, will be designated as quenching. If, instead of quenching, a slow rate of cooling were to be effected, considerable formation of microscopically observable spherulitic crystals would take place, the presence of which appears to go hand-in-hand with lessened toughness, increased brittleness, and increased opacity of the coating. The most satisfactory quenching—resulting in the formation of spherulites of minimum size, along with maximum toughness, pliability, and clarity of the coating—is achieved by, in the case of polyhexamethylene adipamide, e. g., by cooling the molten deposit of polyamide from its melting point, or a higher temperature, down to about 60° C. below its melting point, within approximately one second. When polyamides other than polyhexamethylene adipamide are employed, however, relatively minor variations in the rapidity and extent of such cooling may be found desirable; the preferred conditions for each individual polyamide being readily ascertainable in each instance with reference to the type, thickness, and other characteristics of the coating desired.

In general, coatings in which the spherulites are less than one micron in diameter will be found fully satisfactory in the foregoing respects; and it even is possible, for some purposes, to tolerate coatings having spherulites with diameters as great as five microns.

The ease of quenching depends to a large extend upon the polymer used. As a rule, interpolymers, i. e., polymers prepared from more than the minimum number of polyamide-forming ingredients, are more easily quenched than the simple polymers. Quenching characteristics also may be altered by the addition of plasticizers or other modifying agents.

Differences in the degree of quenching of simple linear polyamides, including polyhexamethylene adipamide, polyhexamethylene sebacamide, poly-epsilon-aminocapramide or their interpolymers are readily shown by the X-ray diffraction patterns. A material which has been thoroughly quenched shows an X-ray diffraction pattern which consists essentially of broad halos. A completely unquenched material gives a pattern characterized by two well-defined rings, the ratio of the diameters of which is about 1.21. With intermediate degrees of quenching the ratio of ring diameters becomes smaller until for a truly amorphous material, it becomes 1.

The toughness and flexibility of the coatings vary correspondingly, and while for many cases it is desirable to have a completely amorphous material, coatings in which the ratios of the ring diameters are as much as 1.16 are satisfactory for some purposes and in some instances ratios as high as 1.18 can be tolerated.

Preferred forms of apparatus appropriate for use in the practice of the invention will now be set forth, followed by details of procedure and illustrations showing the successful carrying out of the invention.

Figure 1:
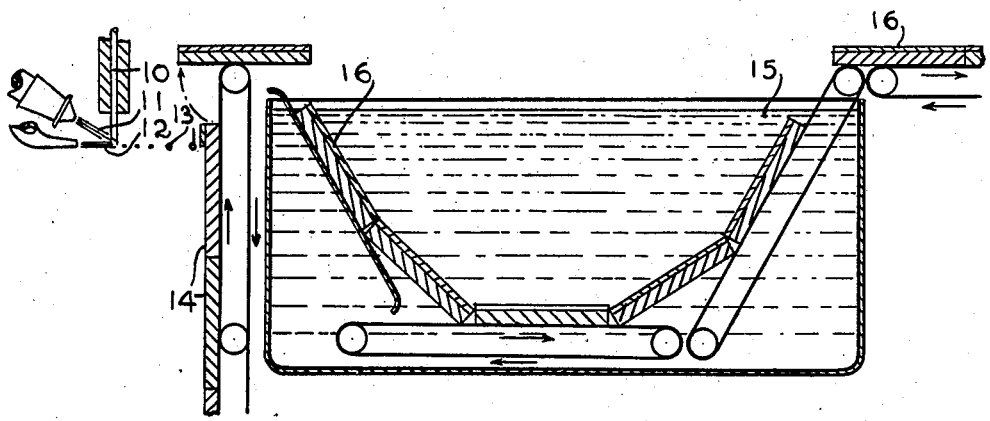
Fig. 1 is a diagrammatic representation of apparatus such as hereinabove referred to, wherein a rod or monofil of the polymer is progressively fed into a flame which melts it, then as atomized and projected by pressured gas onto the base to be coated, and finally is quenched due to conveyance of the base and its coating through a quench bath.

Referring to Fig. 1 particularly, 10 designates a polyamide rod, or polyamide monofil having a relatively large diameter, 11 designates a flame having a minimum of oxidizing action—e. g., an oxy-acetylene flame formed from a mixture slightly rich in acetylene—the said flame being so placed and directed as to melt the tip of the polyamide rod or monofil, which is caused to progress continuously toward it. The number 12 designates a jet of highly compressed, relatively inert gas, e. g., air, which is heated sufficiently to prevent its freezing of the polyamide spray, 13, which it engenders, on being directed against the melting polyamide. The number 14 designates the surface to be coated, against which the compressed gas projects the said spray, and which advantageously may be heated up to temperatures approaching or even slightly exceeding the melting point of the polyamide, in those instances where a quench bath 15 is employed, for immersion of the surface 14 into it, after it has received the desired thickness of polyamide coating 16. The liquid of which 15 is composed usually is water, but other liquids may be employed, so long as they are inert toward, and do not exert a solvent action upon, the polyamide.

When the quench bath 15 is not employed, its function may be served by maintaining the surface 14 at a temperature sufficiently below the melting point of the polyamide composition to effect the desired degree of quenching, without requiring any supplementation by a quench bath. Such a set-up, however, involves the sacrifice of increased evenness and uniformity of thickness of the coating, consequent on the flow which takes place when the deposited polyamide is allowed to remain molten for a short time after its impingement on the base. In the latter situation, it often is of advantage to impart an upward motion to the heated article, just prior to the quenching, in order to take full advantage of the action of gravity in causing equalizing flow. In such case, a continuously operating conveyor system, such as that shown in Fig. 1, conveniently may be employed, to carry the work into the spray and thence into and out of the quench bath.

Figure 2:
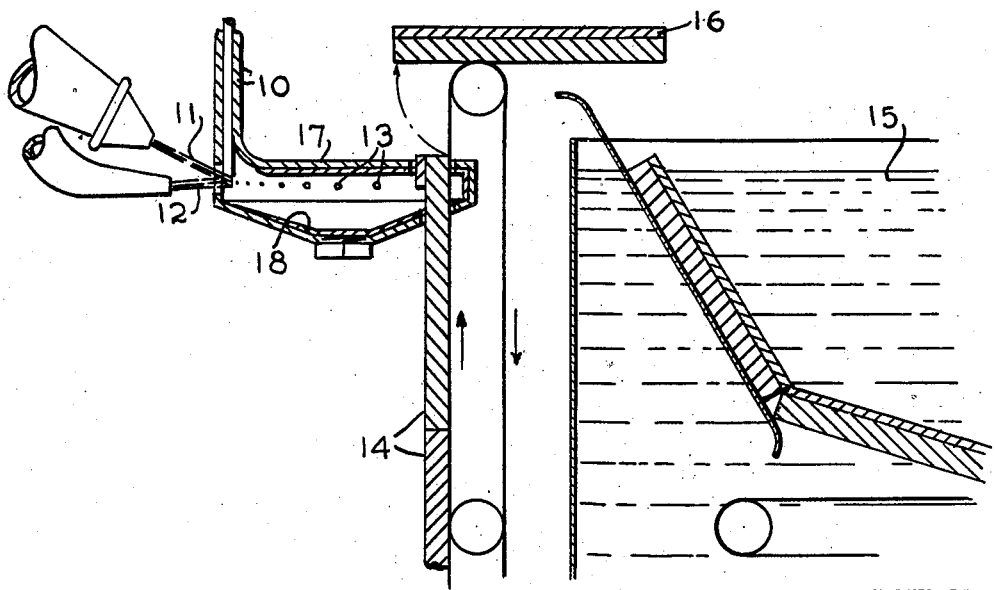
Fig. 2 is a diagrammatic view of a form of apparatus generally similar to that shown in Fig. 1, except that it is adapted to confine the spray of molten polyamide within the zone immediately surrounding the work.

Referring to Fig. 2 particularly, parts 10—16 are respectively similar in function and operation to parts 10—16 of Fig. 1, already described. Walls 17 are provided, however, to confine the spray of molten polyamide within the zone immediately surrounding the work. The inner surfaces of the walls 17 advantageously may be provided with a coating of high melting lubricant 18, to facilitate recovery of the waste polyamide therefrom, for re-use.

*Example*

Using a Schoop type of metal spray gun, corresponding generally to the spray-forming apparatus depicted in Fig. 1, a 20-mil filament of polyhexamethylene adipamide was fed into the gun and, as the filament progressed forward, an oxy-acetylene melting flame similar to that described hereinabove was directed at its tip. The gauge pressures of the oxygen and acetylene were about 22#/sq. in. An atomizing jet of air was projected toward the melting polyamide and carried it to a metal surface which was six inches distant therefrom. The air came from a line having a pressure of 50#/sq. in. Both the compressed air supply and the metal surface were maintained at room temperature.

In varying the conditions of the experiment, it was found that the nature of the coating obtained depended to some extent on the distance between the nozzle of the air jet and the said metal surface. If the latter was too far removed, the polymer tended to solidify before deposition, and gave a non-uniform, porous coating. On the other hand, if the metal surface was too close to the flame, the temperature was raised to such an extent that a burned or brittle coating was obtained.

For certain purposes it often is advantageous to practice a variation of the process of the invention, wherein the solid polyamide already is in the form of minute solid particles before it enters the melting zone. Such minute particles of the polyamide may be formed, for instance, in accordance with the method disclosed in Catlin Serial No. 301,068, filed October 24, 1939, and assigned to the assignee of this application. Where the blast of compressed gas projects such particles toward the work, it often is possible to omit the melting flame altogether, and in its stead to maintain the work at a temperature above that of the melting point of the polyamide. Fusion of the impinging particles consequently takes place instantaneously, at the moment of their deposit upon the surface to be coated.

Whether the just-described variation of the invention be adopted or not, it frequently is desirable to maintain the work at such a temperature that an appreciable interval of time intervenes between impingement of the particles on the surface, and congealment of the resultant deposit in order to take advantage of the hereinabove-mentioned equalizing flow of the molten polymer. In aid thereof, the conveyor system indicated in Fig. 1 easily can be designed, in accordance with methods familiar to those skilled in the art, so as to impart not only an upward motion such as also mentioned hereinabove, but also so as to enhanc the effect thereof by producing an abrupt or sudden angular displacement of the work just prior to its entrance into the quench bath.

Whether quenching be effected by a liquid bath or by maintaining the work at a temperature substantially below the melting point of the polyamide, in the usual practice of the invention, i. e., wherein molten polyamide is comminuted by a blast of gas, it generally is important to maintain the spray particles in a molten condition and above their melting point, rather than to permit them either to solidify or become supercooled prior to impingement on the work. This objective may be furthered by preheating the supply of gas for the blast. A convenient source of heat in such case is that of the melting flame itself.

Whatever thermal variations are employed, either with respect to preheating of the blast or preheating the work, or otherwise, it always is to be borne in mind that the polyamide should not be maintained at excessive temperatures for appreciable periods of time, since degradation of the polymer molecule would result.

After solidification and quenching of the coating, it may be desirable to subject the same to cold-working, in order to produce orientation of the crystalites and consequent enhancement of the toughness and pliability of the coating.

Where the article to be coated is not of a magnetic material, but is to be utilized as, or for the production of, elements of mechanism intended to be operative in a manner responsive to magnetic fields or fluctuations thereof, it may be desirable to mix with the original polyamide melt from which the solid polyamide employed in the practice of the invention is derived, extremely finely divided magnetic particles. These particles, on being carried by and in the spray drops, confer upon the resultant coating magnetic properties serving to render the coated article suitable for the aforesaid purposes. A further advantage may be derived from the presence of such particles in the spray drops, by maintaining an electromagnetic field in a position in posterior proximity to the work. Such a field, by magnetic attraction, serves to augment the velocity of the spray and thus to bring about a more compact coating. This effect is especially desirable where the surface of the work is of a nature which permits a certain degree of impregnation by the molten polyamide, and where such impregnation is especially needed, as for instance, to enhance the anchorage.

In instances where the polyamide is to be in permanent contact with metallic surfaces, either those of magnetic particles such as just mentioned, or where the surface to be coated is itself of a metallic nature, it may be advisable to use polyamide compositions which contain a dihydroxamic acid such as is described in Graves Serial No. 334,081, filed May 8, 1940, and assigned to the assignee hereof. Oxidative deterioration due to the effect of contact with the metal thus will be minimized.

Polymers which, in addition to that specified in the example set forth hereinabove, are particularly useful in the practice of the invention, are those obtained from the combination of hexamethylene diamine or decamethylene diamine with adipic, sebacic, or azelaic acid, as well as the polymer obtained by the condensation of epsilonaminocaproic acid or its amide-forming derivatives, or interpolymers prepared from combinations of the above. A polyamide particularly well adapted to this use is the one prepared from 60 parts of polyhexamethylenediammonium adipate and 40 parts of caprolactam.

Interpolymers prepared from a combination of ester-forming and amide-forming ingredients are also useful. It is also within the scope of this invention to use polymers within these classes which are modified by the addition of plasticizing agents, resins, cellulose derivatives, pigments, or agents added for the purpose of increasing the stability of the polymer when exposed to sunlight or elevated temperatures. Among such stabilizing agents are p-phenylaminophenoxyacetic acid, o-hydroxyphenoxyacetic acid and certain non-heat-hardening resins of the phenol-formaldehyde type, such as the fusible, soluble resins prepared from p-tertiary-butylphenol, o-cyclohexylphenol and formaldehyde with the aid of an acid catalyst, and commercial resins such as Bakelite resin 4036.

The monobasic acid stabilizers mentioned above preferably are used in quantities corresponding to less than two mole per cent based on the diamine or the amino acid, while the phenol-formaldehyde resins, in some cases, may constitute as much as 30 per cent by weight of the final product. Ten and 20 per cent compositions are useful when it is not essential to have a high degree of hardness.

It may be observed that the polyamides described in the patents cited in the sixth paragraph hereinabove contain amide groups

where R is hydrogen or a monovalent hydrocarbon radical) as an integral part of the main chain of atoms in the polymer. It is to be observed further that in these polyamides the average number of carbon atoms in the segments of the chain separating the amide-forming groups is at least two. Accordingly, in this specification and the claims appended hereto, the expression, synthetic linear polyamide, is to be understood as applying to polyamides not only belonging to types described in the aforesaid patents, but also coming within the limitations pointed out in this paragraph.

Also, as a general rule, an increase in the temperature of the surface to be coated results in an increase of adherence, although in the case of relatively thick coatings such increase in temperature is apt to result in greater opacity of the coating.

Anchorage can be aided, of course, by using a base having a vermiculate or reticulate surface. If the article to be coated is entirely reticulate in nature, as for example a screen, the process of the invention will be particularly useful by reason of the fact that the blast of compressed gas will prevent the formation of any film between the filaments of the screen. At the same time, the resultant polyamide coating on the filaments themselves will impart to them a high degree of durability and corrosion resistance. This advantage becomes of exceedingly great importance where the screen is to be used in the vacinity of large bodies of salt water, since metallic screens corrode and deteriorate very rapidly in such localities.

The invention, of course, can be utilized for the repair of damaged or worn surfaces, as well as for the production of entirely new coatings. In such cases the polyamide composition may be provided initially, that is, during manufacture in its original molten state, with coloring matter corresponding to that of the surface to be repaired.

Among the types of materials and articles to the coating of which the process of the invention may be applied, may be mentioned wood, leather, plastic material, ceramic materials, and the like, in addition to the materials and articles already referred to hereinabove. Also, containers for food and beverages, as well as articles in the shape of rods, sheets, tubes, or the like, readily lend themselves to the application thereto of the said process.

By making suitable modifications of a nature readily discernible to those skilled in the art, the process also may be used for the preparation of detached films or sheets. In such case, it frequently is advantageous to precoat the surface of the base with a contact agent or lubricant which aids not only in obtaining a clear, smooth film, but also in improving the contact during the quenching step, and in the removing of the film or sheet from the said surface.

As many apparently widely different embodiments of this invention may be made without departing from the spirit and scope thereof it is to be understood that I do not limit myself to the specific embodiments thereof except as defined in the appended claims.

I claim:

1. The process of forming upon an object a coating comprising crystalline synthetic linear polyamide having a molecular weight above 3,000 and, as a heat-stabilizing agent therefor, a fusible, non-heat-hardening phenol-formaldehyde resin selected from the class consisting of p-tertiary-butylphenol-formaldehyde resin and o-cyclohexylphenol-formaldehyde resin, which process comprises introducing a rod comprising the said polyamide and resin into a substantially non-oxidizing flame, thus melting a portion of the rod, projecting the resultant molten composition by pressured gas against the said object, and maintaining the composition so projected molten until its impingement on the said object.

2. The process of forming upon an object a coating comprising crystalline synthetic linear polyamide having a molecular weight above 3,000 and, as a heat-stabilizing agent therefor, a p-tertiary butylphenol-formaldehyde resin, which process comprises introducing a rod comprising the said polyamide and resin into a substantially non-oxidizing flame, thus melting a portion of the rod, projecting the resultant molten composition by pressured gas against the said object, maintaining the composition so projected molten until its impingement on the said object, and solidifying the said composition by maintaining the temperature of the object at the locus of impingement at a level substantially below the melting point of the said polyamide.

3. The process of forming upon an object a coating comprising crystalline synthetic linear polyamide having a molecular weight above 3,000 and, as a heat-stabilizing agent therefor, an o-cyclohexylphenol-formaldehyde resin, which process comprises introducing a rod comprising the said polyamide and resin into a substantially non-oxidizing flame, thus melting a portion of the rod, projecting the resultant molten composition by pressured gas against the said object, maintaining the composition so projected molten until its impingement on the said object, and solidifying the said composition by maintaining the temperature of the object at the locus of impingement at a level substantially below the melting point of the said polyamide.

4. The process of claim 2 wherein the said polyamide is polyhexamethyleneadipamide.

5. The process of claim 2 wherein the said polyamide is one derived from 60 parts of polyhexamethylenediammonium adipate and 40 parts of epsilon-caprolactam.

MERLIN MARTIN BRUBAKER.